Feb. 28, 1956     D. L. LEHMAN     2,736,475
HOLDER AND ADVERTISING MEDIUM FOR ICE CREAM CONES
Filed Sept. 29, 1952
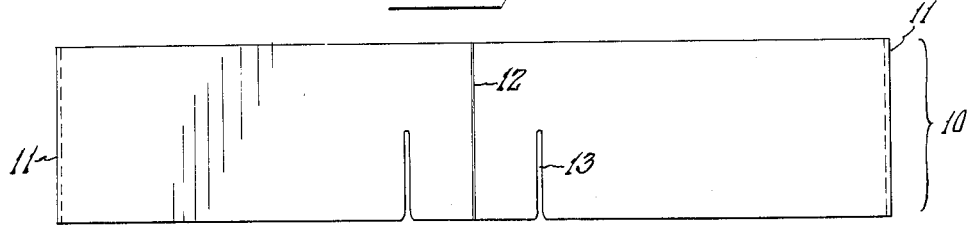
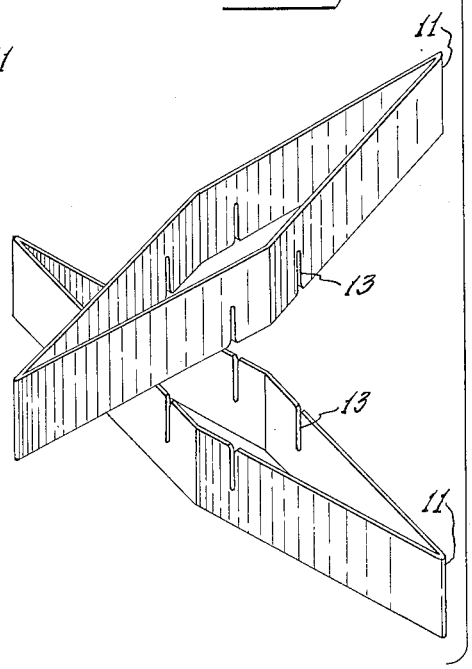
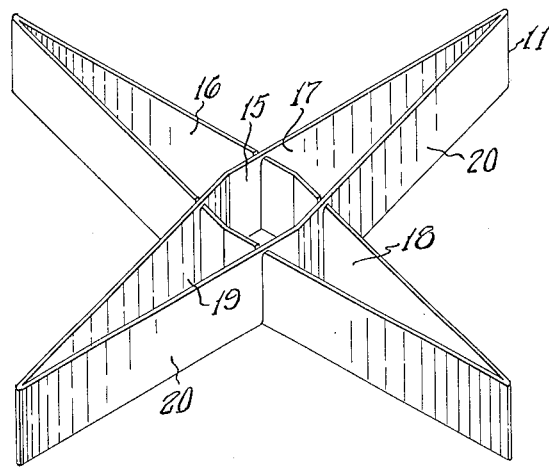
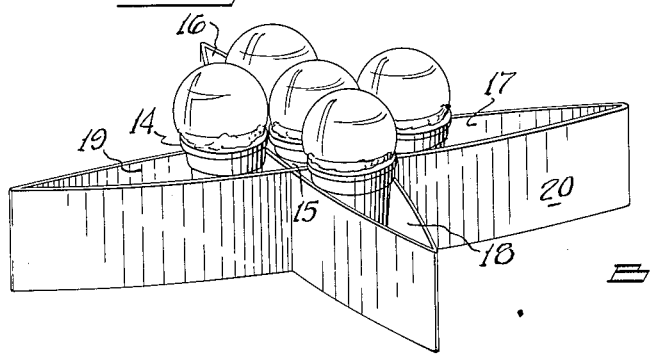
INVENTOR
DWIGHT L. LEHMAN
ATTORNEY

United States Patent Office 2,736,475
Patented Feb. 28, 1956

2,736,475
HOLDER AND ADVERTISING MEDIUM FOR ICE CREAM CONES

Dwight L. Lehman, Portland, Oreg., assignor of one-third to Belle M. Lehman and one-third to Blanche C. Hughes, both of Portland, Oreg.

Application September 29, 1952, Serial No. 312,031

1 Claim. (Cl. 224—48)

This invention relates generally to the confectioner's art and particularly to a holder and advertising medium for ice cream cones for handling a plurality of cones between the service stand and the point of delivery to the individual customer.

The main object of this invention is to provide an exceedingly simple and efficient form of carrier, which will be inexpensive to construct, light in weight, and which is completely collapsible when not in use.

The second object is to provide an excellent form of medium of advertising the cream being handled, the name of its manufacturer, or for the store vending the cream.

A further object is to provide a holder, which can be used for cones of various sizes.

I accomplish these and other objects in the manner set forth in the following specifications as illustrated in the accompanying drawing, in which—

Fig. 1 is an elevation of a folded unit.

Fig. 2 is an edge view of the unit shown in Fig. 1.

Fig. 3 is a perspective view showing the two parts being placed in position prior to assembly.

Fig. 4 is a perspective view of the units assembled.

Fig. 5 is a perspective view showing the device in use holding a plurality of filled cones.

Like numbers of reference refer to the same or similar parts throughout the several views.

Referring in detail to the drawing, there is shown a band of chip board 10, which normally lies flat, as shown in Fig. 1, with two ply thickness and folded sharply across the ends 11, while the band between the ends 11 is subdivided by the crease 12. On each side of the crease 12 are the slots 13, which extend half-way across the band 10.

In the use of this device the parts are assembled as shown in Fig. 4 and advertising matter is displayed on the exterior of the bands 10 by ordinary printing or otherwise.

In Fig. 5 are shown ice cream cones 14 of the smaller type, one of which occupies the pocket 15 and the others of which occupy the pockets 16, 17, 18 and 19.

It will be noted that the portions 20 bend outwardly to accommodate whatever size cone 14 is placed in the pockets 16 to 19, inclusive, making the holder adaptable for cones of any size. Obviously the length of the portions 20 may be varied at will without departing from the spirit of the invention.

I claim:

A portable self-sustaining open bottom hand carrier for ice cream cones and the like comprising a pair of assembled identical tubular sections, each section being transversely creased equi-distantly and adapted to be folded and lie flat when the sections are disassembled, said sections being identically transversely slotted half-way through the width thereof perpendicular to one edge to interlock when superimposed and the slots thereof engaged with each other to form a four pointed star shaped holder having five compartments for five identical objects, said sections comprising flat bands of stiff material which are disposed in substantially flat vertical planes in assembled position forming a central compartment and one outlying compartment in each star point.

References Cited in the file of this patent

UNITED STATES PATENTS

| 1,216,208 | Bussey | Feb. 13, 1917 |
| 1,338,744 | McIntosh | May 4, 1920 |
| 2,330,346 | Elliot | Sept. 28, 1943 |

FOREIGN PATENTS

| 562,778 | Great Britain | July 14, 1944 |